(12) United States Patent
Serotta et al.

(10) Patent No.: US 10,513,301 B2
(45) Date of Patent: Dec. 24, 2019

(54) FENDER AND FENDER ASSEMBLY FOR A CYCLING APPARATUS

(71) Applicant: Lyft, Inc., San Francisco, CA (US)

(72) Inventors: Benjamin Serotta, Saratoga Springs, NY (US); Evan Christian Solida, Weaverville, NC (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 15/586,978

(22) Filed: May 4, 2017

(65) Prior Publication Data

US 2017/0320531 A1    Nov. 9, 2017

Related U.S. Application Data

(60) Provisional application No. 62/332,236, filed on May 5, 2016.

(51) Int. Cl.
*B62J 15/02* (2006.01)

(52) U.S. Cl.
CPC .................................. *B62J 15/02* (2013.01)

(58) Field of Classification Search
CPC .......... B62J 15/02; B62J 15/00; B62K 21/02; B62K 25/16; F01B 17/025
See application file for complete search history.

(56) References Cited

U.S. PATENT DOCUMENTS

| | | | | |
|---|---|---|---|---|
| 741,997 A | * | 10/1903 | Beckwith | B62J 15/00 160/68 |
| 1,189,874 A | * | 7/1916 | Schickel | B62K 25/16 280/277 |
| 1,408,719 A | * | 3/1922 | Borgo | B62J 15/04 280/152.1 |
| 1,527,133 A | * | 2/1925 | Harley | B62K 25/08 280/277 |
| 2,537,679 A | * | 1/1951 | Kraeft | B62K 25/16 280/277 |
| 4,280,582 A | * | 7/1981 | Kouyama | B62K 11/04 180/219 |
| 4,319,763 A | * | 3/1982 | White | B62J 15/00 280/152.3 |
| 5,026,083 A | * | 6/1991 | Wendorf | B62J 15/02 280/152.1 |
| 5,165,712 A | * | 11/1992 | Fuller | B62J 15/00 280/152.1 |

(Continued)

*Primary Examiner* — Brian L Swenson
(74) *Attorney, Agent, or Firm* — Jones Robb, PLLC

(57) ABSTRACT

A fender for a cycling apparatus is provided. The fender may include a front portion, a rear portion, and an outer surface and an inner surface that each extend from the rear portion to the front portion. The fender may further include a mount portion disposed between the rear portion and the front portion. The mount portion may include a first engagement part configured to engage with at least one blade of a pair of spaced apart blades of a fork assembly, and a second engagement part. A first engagement part may be configured minimize side-to-side motion of the fender relative to a fork assembly and a second engagement part configured to minimize fore-and-aft motion of the fender relative to the fork assembly. A fender elongated body may have a generally convex outer surface and a generally concave inner surface, the inner surface defining a hollow cavity of the body.

28 Claims, 9 Drawing Sheets

(56) References Cited

U.S. PATENT DOCUMENTS

| | | | | |
|---|---|---|---|---|
| 5,186,274 | A * | 2/1993 | Hegman | B62J 15/00 180/227 |
| 5,275,427 | A * | 1/1994 | Gasser | B62C 1/00 280/152.3 |
| 5,562,296 | A * | 10/1996 | Hall | B62J 15/00 280/152.1 |
| 5,700,022 | A * | 12/1997 | Finnson | B62J 15/00 280/152.3 |
| 5,775,454 | A * | 7/1998 | Scherbarth | B62K 25/16 180/219 |
| 5,857,538 | A * | 1/1999 | Chambers | B62K 11/04 180/219 |
| 5,950,975 | A * | 9/1999 | Zieske | B62D 25/168 248/291.1 |
| 6,029,988 | A * | 2/2000 | Edwards | B62C 1/08 280/152.2 |
| 6,073,948 | A * | 6/2000 | Motojima | B62J 1/28 180/219 |
| 6,152,267 | A * | 11/2000 | Iwai | B60T 1/065 188/18 A |
| 6,199,883 | B1 * | 3/2001 | Gable | B62J 15/00 280/152.1 |
| 6,217,048 | B1 * | 4/2001 | Saiki | B62J 15/02 280/152.1 |
| 6,257,362 | B1 * | 7/2001 | Scherbarth | B62J 15/02 180/219 |
| 6,312,000 | B1 * | 11/2001 | Pauls | A61G 5/043 180/907 |
| 6,331,011 | B1 * | 12/2001 | Feldmann | B62J 15/00 280/152.1 |
| 6,336,647 | B1 * | 1/2002 | Iwai | B62K 25/08 180/219 |
| 6,357,775 | B1 * | 3/2002 | Iwai | B62K 25/24 180/219 |
| D456,329 | S * | 4/2002 | Thomas | D12/186 |
| 6,435,533 | B1 * | 8/2002 | Chuang | B62J 15/00 280/152.1 |
| 6,634,664 | B1 * | 10/2003 | Kojima | B62J 15/02 224/423 |
| 6,651,769 | B2 * | 11/2003 | Laivins | B62J 15/00 180/229 |
| 7,036,837 | B1 * | 5/2006 | Bauer | B62J 15/02 180/219 |
| 7,108,407 | B2 * | 9/2006 | Kashiwagi | B62J 6/04 362/473 |
| 7,325,639 | B2 * | 2/2008 | Yamaguchi | B62J 15/00 180/219 |
| 7,431,316 | B2 * | 10/2008 | Chuang | B62J 15/00 280/152.1 |
| 7,559,580 | B2 * | 7/2009 | Ara jo | B62J 15/02 280/152.1 |
| 7,625,012 | B2 * | 12/2009 | Hsu | B62J 15/02 280/152.1 |
| 8,016,307 | B2 * | 9/2011 | Adachi | B62J 15/02 280/152.1 |
| 8,172,246 | B2 * | 5/2012 | Bybee | B62J 15/02 280/152.1 |
| 8,246,062 | B2 * | 8/2012 | Hsu | B62J 15/02 280/152.1 |
| 8,678,412 | B1 * | 3/2014 | Oliveras, Jr. | B62M 9/04 280/210 |
| 9,004,513 | B1 * | 4/2015 | Schacht | B62J 15/00 280/152.3 |
| 9,004,514 | B1 * | 4/2015 | McMahon | B62J 15/00 280/152.1 |
| 9,663,175 | B2 * | 5/2017 | Kitayama | B62J 15/00 |
| 9,663,176 | B1 * | 5/2017 | Hsu | B62J 15/02 |
| D813,768 | S * | 3/2018 | Serotta | D12/186 |
| 2003/0047934 | A1 * | 3/2003 | Tsukiji | B62J 17/02 280/847 |
| 2003/0116937 | A1 * | 6/2003 | Blythe | B62J 15/00 280/152.1 |
| 2003/0121708 | A1 * | 7/2003 | Laivins | B62J 15/00 180/229 |
| 2005/0062278 | A1 * | 3/2005 | Griffin | B62J 15/02 280/847 |
| 2005/0179245 | A1 * | 8/2005 | Hartmann | B62D 25/168 280/847 |
| 2006/0000652 | A1 * | 1/2006 | Yamaguchi | B62J 15/00 180/68.3 |
| 2006/0076380 | A1 * | 4/2006 | Ockenden | B62J 7/02 224/419 |
| 2006/0108765 | A1 * | 5/2006 | Teich | B62D 25/186 280/157 |
| 2007/0085296 | A1 * | 4/2007 | Chuang | B62J 15/00 280/152.1 |
| 2008/0054585 | A1 * | 3/2008 | Konno | B62J 15/00 280/152.1 |
| 2008/0290625 | A1 * | 11/2008 | Kuo-Chung | B62J 15/00 280/152.1 |
| 2008/0315547 | A1 * | 12/2008 | Hsu | B62J 15/02 280/152.1 |
| 2016/0068015 | A1 * | 3/2016 | Magee | B60B 3/007 296/180.1 |
| 2016/0244118 | A1 * | 8/2016 | Tanabe | B62J 23/00 |
| 2016/0272127 | A1 * | 9/2016 | Hosoya | B60R 13/00 |
| 2019/0009851 | A1 * | 1/2019 | Ohara | B62J 15/00 |

* cited by examiner

FENDER AND FENDER ASSEMBLY FOR A CYCLING APPARATUS

CROSS REFERENCE TO RELATED APPLICATIONS

This application claims the benefit of priority of U.S. Provisional Patent Application No. 62/332,236, filed May 5, 2016, the entire contents of which are incorporated herein by reference.

TECHNICAL FIELD

The present disclosure relates generally to fenders and fender assemblies for a cycling apparatus. The present disclosure relates more specifically to a front fender configured to mate with a fork assembly of a cycling apparatus, and to a front fender assembly including the same.

BACKGROUND

Fenders are desirably configured to prevent sand, mud, rocks, liquids, and other road spray from being thrown into the air by a rotating wheel. To maintain desirable deterrence of wayward road spray, a fender must generally maintain its original shape and its original position relative to the wheel.

Conventional fenders rely on one or more braces or struts to control the shape of the fender (e.g., prevent permanent deformation and breakage of the fender), and/or to aid in the prevention or reduction of undesirably excessive fore-and-aft motion and/or side-to-side motion of the fender relative to the wheel, fork assembly, and/or frame of a cycling apparatus. Such braces or struts generally extend from one or both of the spaced apart blades of a fork assembly, respectively. In particular, each brace is often an elongated member that has a first end that is coupled to one of the spaced apart blades of a fork assembly, and a second end that is coupled to a side or a side edge of the fender.

However, while such braces or struts can adequately control the shape of a fender and/or may reduce or prevent undesirable fore-and-aft motion and/or side-to-side motion for some duration of time, these types of braces or struts add to the total number of components in a fender assembly, which increases the fender assembly's overall complexity. Accordingly, braces and struts undesirably increase the total number of components to be repaired or replaced when a fender assembly component is damaged. Moreover, braces and struts also undesirably increase the time required to repair and/or replace a fender assembly.

Accordingly, it may be desirable to provide a fender that can be coupled or otherwise attached to a fork assembly without one or more braces or struts that extend from one or more blades of the fork assembly. In particular, it may be desirable to provide a fender that can be coupled or otherwise attached to a fork assembly without one or more braces or struts as described above, and also control its shape (e.g., prevent permanent deformation and breakage of the fender). Additionally, it may be desirable to provide a fender that can be coupled or otherwise attached to a fork assembly also in a manner that reduces or prevents undesirable fore-and-aft motion and/or side-to-side motion of the fender relative to the wheel, fork assembly, and/or frame of a cycling apparatus. Further, it may be desirable to provide a fender assembly that minimizes the number of components to be manipulated during repair and/or replacement of a fender to decrease time and improve efficiency during such repair and/or replacement.

SUMMARY

In accordance with various exemplary embodiments of the present disclosure, a fender for a cycling apparatus is provided. The fender includes a front portion, a rear portion, and an outer surface and an inner surface that each extend from the rear portion to the front portion. The fender further includes a mount portion disposed between the rear portion and the front portion. The mount portion includes a first engagement part configured to engage with at least one blade of a pair of spaced apart blades of a fork assembly.

In accordance with another aspect of the present disclosure, a fender includes an elongated body having a generally convex outer surface and a generally concave inner surface. The inner surface defines a hollow cavity of the body. The hollow cavity has a length extending from a front of the body to a rear of the body, a width extending between side edges of the body, and a depth extending between an inner surface of the body and an imaginary line extending centrally between the side edges of the body and generally parallel with the side edges of the body. The depth of the cavity varies along the length of the cavity.

In accordance with a further aspect of the present disclosure, a cycling apparatus includes a fork assembly including a pair of spaced apart blades, each blade comprising a respective wheel receiving portion. The cycling apparatus also includes a wheel with an axle including a pair of axle end portions, each axle end portion being rotatably received in the respective wheel receiving portion. The cycling apparatus further includes a fender comprising an elongated body having a generally convex outer surface and a generally concave inner surface, the inner surface defining a hollow cavity of the body. The hollow cavity includes a length extending from a front of the body to a rear of the body, and a width extending between side edges of the body. A distance between an approximate longitudinal centerline of an inner surface of the body and a radial surface of the wheel varies along a length of the elongated body.

In accordance with yet another aspect of the present disclosure, a cycling apparatus includes a fork assembly including a pair of spaced apart blades, each blade comprising a respective wheel receiving portion. The cycling apparatus also includes a wheel with a rim and an axle including a pair of axle end portions, each axle end portion being rotatably received in the respective wheel receiving portion. The cycling apparatus further includes a fender. The fender includes a front portion, a rear portion, and a mount portion disposed between the rear portion and the front portion The mount portion includes a first engagement part configured minimize side-to-side motion of the fender relative to the fork assembly and a second engagement part configured to minimize fore-and-aft motion of the fender relative to the fork assembly.

Additional objects and advantages will be set forth in part in the description which follows, and in part will be obvious from the description, or may be learned by practice of the present teachings. The objects and advantages of the present disclosure will be realized and attained by means of the elements and combinations particularly pointed out in the appended claims.

It is to be understood that both the foregoing general description and the following detailed description are exemplary and explanatory only and are not restrictive of the claimed subject matter. The accompanying drawings, which are incorporated in and constitute part of this specification, illustrate exemplary embodiments of the present disclosure and together with the description, serve to explain principles of the present teachings.

BRIEF DESCRIPTION OF THE DRAWINGS

At least some features and advantages of the present teachings will be apparent from the following detailed description of exemplary embodiments consistent therewith, which description should be considered with reference to the accompanying drawings, wherein.

Figure 1A:
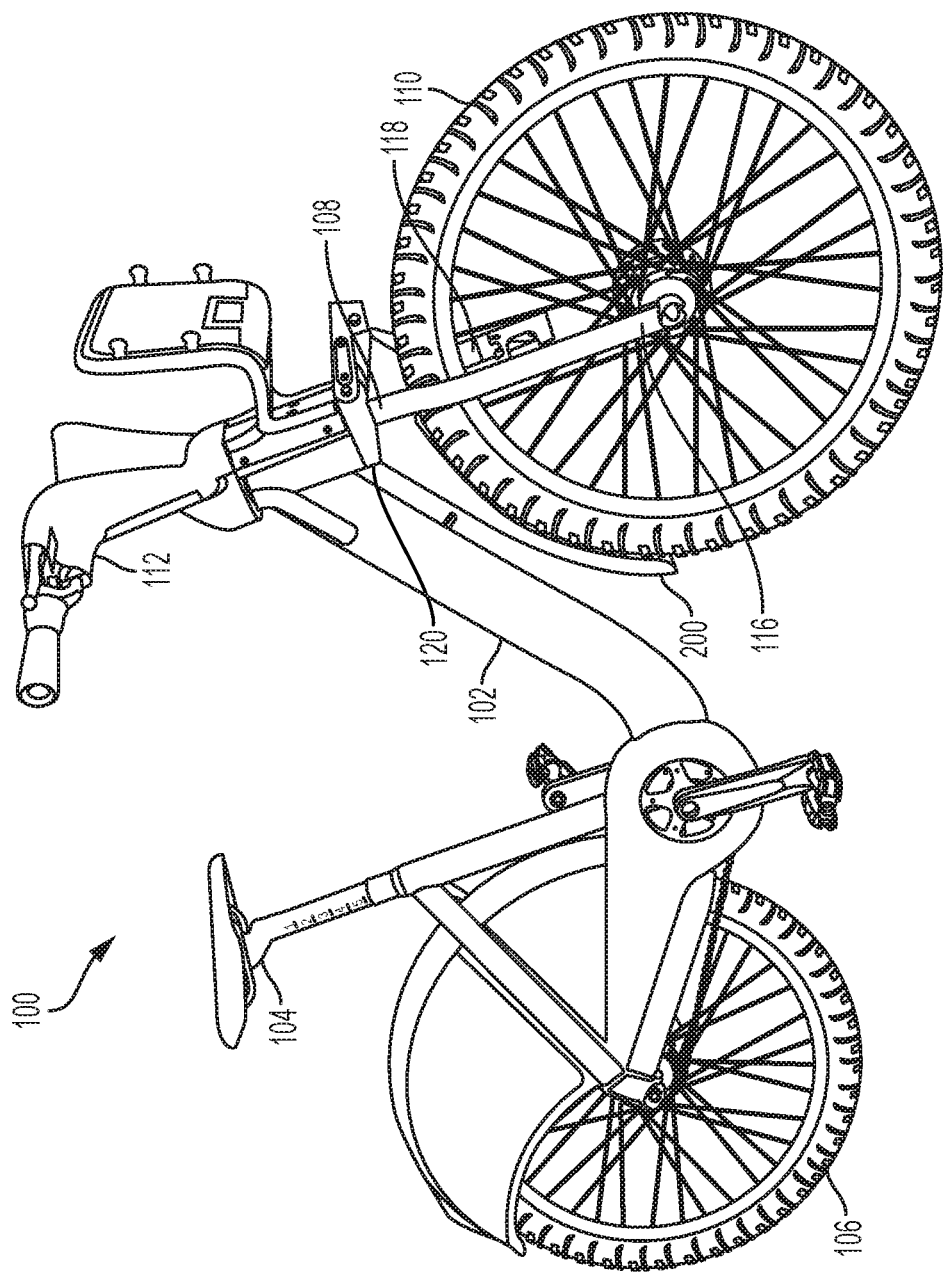
FIG. 1A is a side perspective view of an exemplary embodiment of a bicycle that includes an exemplary embodiment of a fender in accordance with the present teachings.

Although the following detailed description makes reference to exemplary illustrative embodiments, many alternatives, modifications, and variations thereof will be apparent to those skilled in the art. Accordingly, it is intended that the claimed subject matter be viewed broadly.

DESCRIPTION OF EXEMPLARY EMBODIMENTS

Reference will now be made in detail to various exemplary embodiments, examples of which are illustrated in the accompanying drawings. The various exemplary embodiments are not intended to limit the disclosure. To the contrary, the disclosure is intended to cover alternatives, modifications, and equivalents of the exemplary embodiments. In the drawings and the description, similar elements are provided with similar reference numerals. It is to be noted that the features explained individually in the description can be mutually combined in any technically expedient manner and disclose additional embodiments of the present disclosure.

The present disclosure contemplates fenders and fender assemblies for a cycling apparatus. In accordance with one aspect of the present disclosure, a fender assembly may include a fender and at least one fastener. In accordance with the present teachings, a fender may include a body, such as an elongated body. The fender body may define a hollow cavity, which in turn may be delineated at least partially by a front edge, a rear edge, and a pair of curved side edges of the elongated body. For example, in accordance with one exemplary embodiment, the fender body may have a generally or substantially convex shape or appearance. The elongated body may have an outer surface and an inner surface. The inner surface may define an interior part of the hollow cavity. For example, in accordance with one exemplary embodiment, the interior of the fender body/hollow cavity may have a generally or substantially concave shape or appearance. Both the inner and outer surfaces may extend from a front end to a rear end of the elongated body of the fender.

In accordance with one aspect of the present disclosure, the fender may be formed to be connected to a cycling apparatus in an interlocking manner such that at least one of fore/aft, rotational, and lateral movement is limited with respect to portions of a cycling apparatus to which is connected (e.g., a fork assembly). In one exemplary embodiment, the interlocking connections between the fender and the elements to which it is connected are sufficient to limit at least one of fore/aft, rotational, and lateral (side-to-side) movement relative to the cycling apparatus without use of external supports. In one example, the fender and connections may be formed of materials that are sufficiently rigid to withstand normal use (including anticipated abuse to which rental cycling apparatus may be exposed). In another example, the fender and connections may be formed from materials that will flex and/or deform under anticipated loads (i.e., normal use as described above) and will return to an original form/shape when the load is removed. As will be understood by those of skill in the art, various combinations of materials, differently shaped structures, and interlocking components may be used to achieve such exemplary structures, including, for example, resilient plastics and composite materials, longitudinal components made of spring steel or other materials that will not plastically deform.

As disclosed herein, a fender in accordance with the present teachings may include a front portion, a rear portion, and a mount portion. The mount portion may be disposed between the rear portion and the front portion. The mount portion may include a first engagement part configured to inhibit side-to-side motion of the fender relative to the fork assembly and the wheel rotatably attached thereto. In one exemplary embodiment and in accordance with the present teachings, the first engagement part may be configured to engage or otherwise interact with at least one blade of a pair of spaced apart blades of a fork assembly. For example, the first engagement part may include one or more recessed areas and/or depressions configured to receive or otherwise engage a blade of the fork assembly. The recessed areas may be, for example, formed in the body of the fender. Such integrally formed recesses may be formed, for example, by injection molding. Such integrally formed recessed may be laminated with another material, for example, a material with a relatively higher damping coefficient than that of the material of the fender. Additionally or alternatively, structures may be connected to the body of the fender for connection to the blades of the fork assembly. For example, straps or intermediate structures containing a recess and formed of a material different from the fender (e.g., a material with a relatively higher damping coefficient than that of the material of the fender) may be attached to the fender.

In accordance with another aspect of the present disclosure, the mount portion may include a second engagement part configured to inhibit fore-and-aft motion of the fender relative to the fork assembly. In one exemplary embodiment and in accordance with the present teachings, the second engagement part may be configured to engage with a portion of the fork assembly other than a blade of the fork assembly. For example, the second engagement part may include one or more protruding elements, such as post elements, configured to engage with a portion of the fork assembly. The number, shape, and character of the protrusions may vary. For example, it is contemplated that the protrusions may be provided on a plate or an alternative structure of the fork assembly while the fender may include recesses configured to receive the protrusions. Additionally or alternatively, both of the fender and the plate may each include protrusions and recesses configured to correspondingly engage respective recesses and protrusions in the opposing component. Additionally, protrusions and/or recesses may have a variety of shapes and sizes may be tapered or graduated or have other textured elements. The fit between the two may be, for example, a press fit or a snap fit. In addition, mechanical or other components may be used to strengthen the connection between the protrusion and recess. For example, screws or adhesive may be used.

In one exemplary embodiment, each post may extend from an outer surface of the fender. Each post may be hollow and have openings at its opposing ends, such that the post is configured to at least partially receive a fastener. Alternatively, the second engagement part could include recesses configured to receive post elements of the fork assembly. By virtue of the one or more engagement parts, the plurality of posts, and/or the plurality of corresponding fasteners, a fender as disclosed herein can interlock with a fork assembly so as to sufficiently inhibit, limit, or minimize fore-and-aft motion and side-to-side motion of the fender relative to the fork assembly and wheel without wire braces engaging the blades of fork assembly and the fender. Although disclosed in this embodiment as hollow and having open ends, one of skill in the art will understand that these aspects of the post may be varied depending on the size, material, and shape of the post as well as the manner of connection of the post to the fork assembly.

Further, although described in the above embodiment as not including wire braces engaging the blades of the fork assembly and the fender, it should be understood that the teachings of the present disclosure do not prevent the use of such braces, and that the use of the braces in combination with the present teachings is contemplated within this disclosure.

A fender in accordance with the present disclosure may include reinforcement structures such as, for example, reinforcement elements. In various exemplary embodiments, the body of a fender may include a plurality of reinforcement elements such that the plurality of reinforcing elements extend along a length of the body. Reinforcing elements may be molded into the inner surface of the body. Furthermore, a plurality of reinforcement elements in accordance with the present teachings may be disposed in a variety of arrangements such as, for example, along a centered midline of the fender and/or angulated therefrom. In one example, ribbing may be used in a variety of patterns and proportions. Additional or alternative reinforcement elements may be incorporated into the core of the body, for example, a hollow core or honeycomb core. Reinforcements may be incorporated into the fender or other components in a variety of ways, for example, through lamination, 3D printing, additive manufacturing, and material processes such as metal matrix. The structure, size, shape, and material of the reinforcement structure and method of incorporating the same may be dependent, at least in part, on the specific component to be reinforced and its intended use. Also, additional or alternative reinforcement elements may be incorporated onto the exterior of the body, such as, for example, through the use of laminates.

A fender in accordance with the present disclosure generally may be formed via a molding process, such as injection molding. Accordingly, it is contemplated that the fender be made of from a uniform material, and that the material is one that is capable of being molded, such as, for example, a thermoplastic material. Alternatively, a fender in accordance with the present disclosure may be vacuum-formed (e.g., thermoforming,) compression molded, blow-molded with a hollow core, rotomolded, or bladder molded. The present disclosure contemplates that other suitable materials may be selected as appropriate for the particular method of molding the fender, as would be understood by those of skill in the art.

The material of manufacture may have certain properties. Particularly, it is desirable that the material exhibits high strength and high durability at a wide range of temperatures (e.g., a range encompassing all ambient temperatures that a cycling apparatus equipped with the fender is expected to be exposed to during use and/or storage). Additionally, it is desirable that the fender material be sufficiently rigid so as to not require braces to sufficiently inhibit, limit, or minimize fore-and-aft and side-to-side motion of the fender relative to the fork assembly and wheel of the cycling apparatus. Additionally or alternatively, it is possible that braces may be used with the fender of the present disclosure, which may also provide additional options for material selection beyond those conventionally selected, as the combination of the fender of the present disclosure and the braces may further resist any relative motion between the fender and the fork assembly. Further, it also is desirable that the fender material be elastic enough so that permanent plastic deformation and/or rupture does not occur when the fender is bent or subject to a sudden impact. Moreover, it is desirable that the fender be made from a material that is resistant to corrosive effects of salts and other corrosive agents that a fender that it is reasonably foreseeable to be exposed to through the course of regular usage and storage of the cycling apparatus such as, for example, sweat, sun, ozone, UV rays, etc. For example, the inventors have identified various polypropylene impact copolymer materials that may be used as the uniform material of the fender and sufficiently exhibit many, if not all, of the above properties. Additional examples of suitable materials include thermoplastic polymers such as Acrylonitrile Butadiene Styrene (ABS) and Polycarbonate (PC). Fenders and fender assemblies of the present disclosure are less susceptible to damage in part because the uniform material that the fender is from exhibits at least one of the properties set forth above.

Although discussed primarily herein with respect to pedal-powered bicycle applications, the present disclosure contemplates that the various fenders disclosed herein may be suitable for many pedal-powered cycling apparatuses, including, for example, tricycles, unicycles, quadricycles, tandems, recumbents, bear/pub cycles, pedal-cabs, etc. Furthermore, the present disclosure contemplates that the various fenders disclosed herein may be suitable for motorized cycling apparatuses, including, for example motorcycles, motorbikes, scooters, electric bicycles (e-bikes), etc. Moreover, the present disclosure contemplates that the various fenders disclosed herein may be suitable for various other types of wheeled vehicles, including, for example automobiles, ATVs, etc.

Figure 1B:
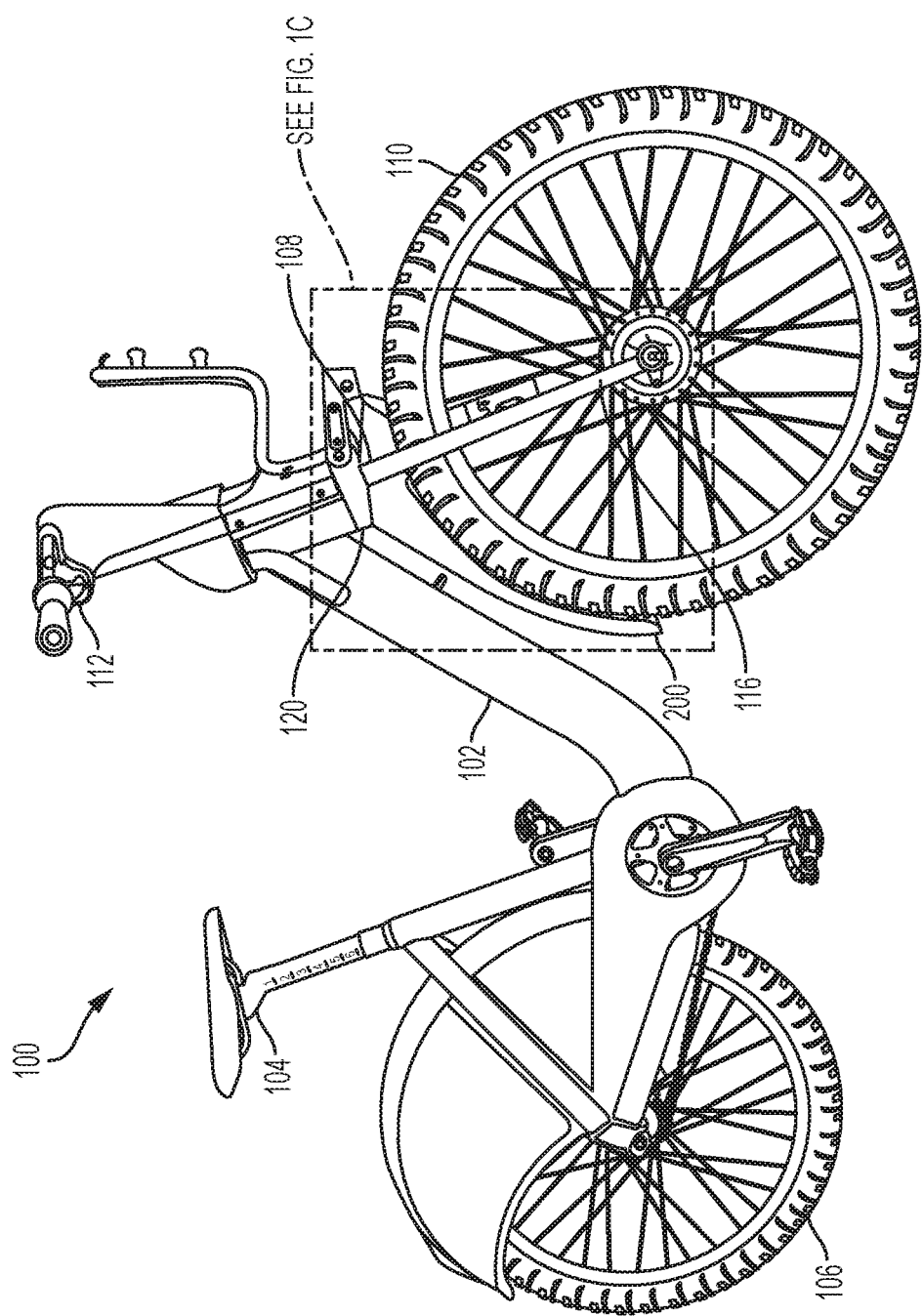
FIG. 1B is a side view of the bicycle of FIG. 1A.

Turning now to the drawings, with reference to FIGS. 1A and 1B, a side perspective view and side view, respectively, of an exemplary embodiment of a bicycle 100 in accordance with the present disclosure is shown. The bicycle 100 includes a frame 102 and a saddle assembly 104, the saddle assembly 104 being adjustably mounted to the frame 102 and configured for a rider to sit on the bicycle 100. A rear wheel 106 is rotatably mounted to the frame 102. The bicycle 100 further includes a fork assembly 108 operatively mounted to the frame 102 and a front wheel 110 rotatably mounted to the fork assembly 108. A handle bar 112 is mounted on the fork assembly 108 for allowing the rider to control the moving direction of the bicycle 100 while riding it. Additionally, mounted to the fork assembly 108 is a fender 200 that acts as a guard for the front wheel 110 and prevents sand, mud, rocks, liquids, and other road spray from being thrown into the air by wheel 110, as it will become apparent below.

As shown in FIGS. 1A and 1B, the fender 200 is mounted to fork assembly 108 without one or more elongated braces extending from either of the pair of spaced apart blades 116, 118 of the fork assembly 108 (blade 118 being obscured from view by blade 116 in FIG. 1B). Rather, the fender 200 has a mount portion that includes a first engagement part configured to engage with first spaced apart blade 116 and a second engagement part configured to engage with second space apart blade 118. By engaging the first engagement part with first blade 116 and/or engaging the second engagement part with second blade 116, at least side-to-side motion of the fender relative to the fork assembly 108 and wheel 110 is inhibited or limited. Fore-and-aft motion of the fender relative to the fork assembly 108 and wheel 110 may also be inhibited or limited by engaging the blades 116 and 118 with the first and second engagement parts as described herein.

Figure 1C:
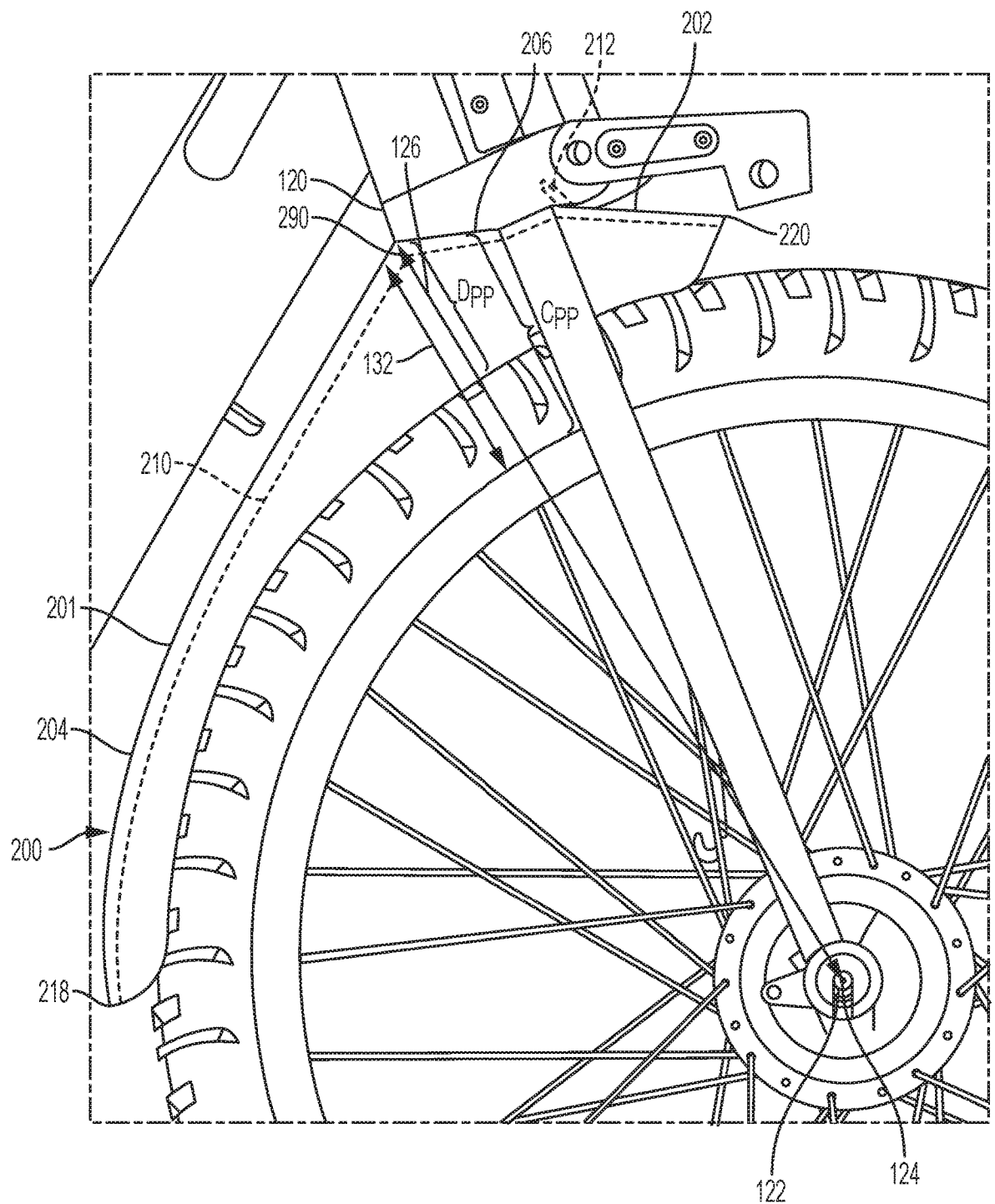
FIG. 1C is an enlarged view of a portion of the side view of the bicycle of FIG. 1B as indicated by the dotted lines in FIG. 1B.

Turning now to FIG. 1C, a detailed side view of a portion of the bicycle of FIGS. 1A and 1B is shown. In FIG. 1C, the fender 200 includes dashed broken lines which represent portions and surfaces of the fender along a longitudinal center cross section of the finder that are obstructed from view. FIG. 1C shows an engagement part in the form of a protrusion, e.g., post 212, configured to engage with a portion of the fork assembly 108 and inhibit, limit, or minimize at least fore-and-aft motion of the fender 200 relative to the fork assembly 108 and wheel 110. In particular, post 212 is configured to engage with an upper plate, i.e., a fork crown 120 of the fork assembly 108. For example, fork crown 120 may include a corresponding recess, a depression, or a hole configured to receive and retain a protrusion such as, for example, post 212. In various exemplary embodiments, the post 212 may be retained in a recess, depression, or hole of the fork crown 120 via a press fit or other type of friction fit. An exemplary embodiment may further include a post 212 and corresponding recess, depression, or hole of plate 120 each having mechanical features configured to further enhance the fit such as, for example, ridges, notches, and/or steps. Enhancing the fit between post 212 and plate 120 in this manner may further inhibit, limit, or minimize at least fore-and-aft motion of the fender relative to the fork assembly 108 and wheel 110. Additionally, or alternatively, as will be understood by those of skill in the art, the fork crown 120 may contain one or more posts and the fender may be configured to contain recesses, depressions, or holes to receive those posts.

It is noted that post 212 is centered along the longitudinal midline of the fender 200, and thus a cross section of the post 212 is shown in FIG. 1C in dotted line. Fender 200 may include additional protrusions or posts (e.g., posts 214 and 216 shown in FIGS. 2A-2F) that are disposed along one or more other longitudinal planes of the fender 200. Side-to-side motion of the fender relative to the fork assembly 108 and wheel 110 may also be inhibited, limited, or minimized by engaging one or more posts (e.g., posts 212, 214 and/or 216) with a portion of the fork assembly (e.g., fork crown 120). By virtue of the collective effect of having one or more engagement parts and/or one or more posts which are configured to engage multiple parts of the fork assembly in multiple planes, both fore-and-aft motion and side-to-side motion of the fender relative to the fork assembly and wheel is effectively inhibited, limited, or minimized.

Figure 2A:
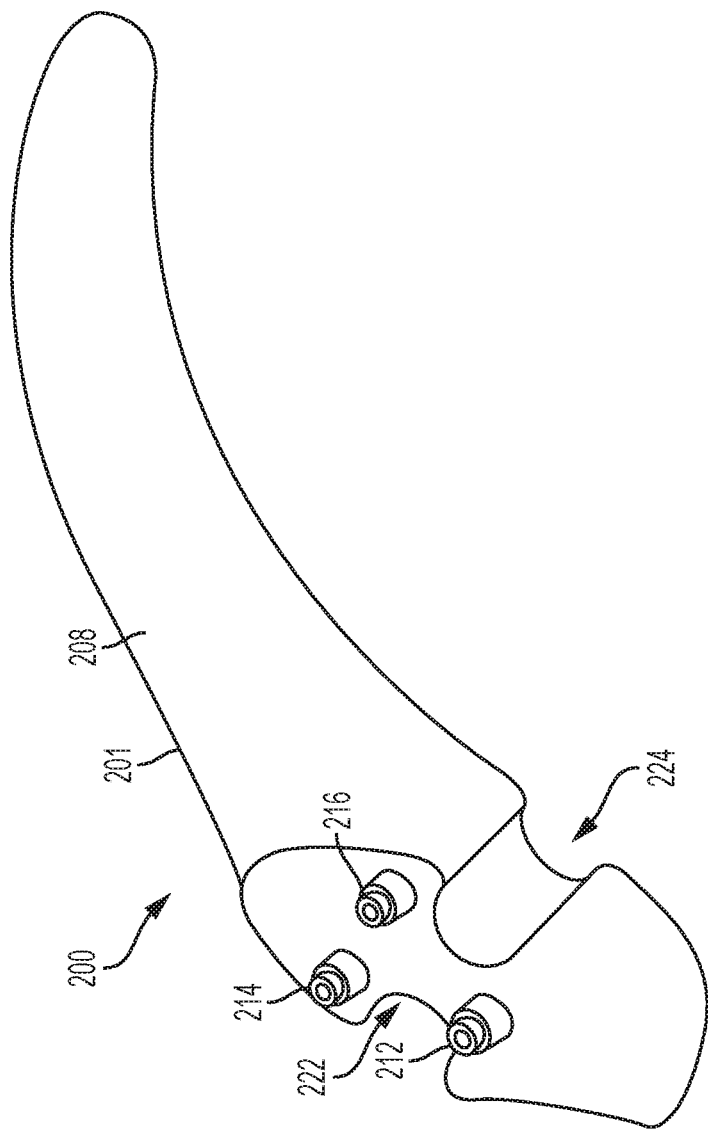
FIG. 2A is a perspective view of an exemplary embodiment of a fender in accordance with the present disclosure.
Figure 2B:
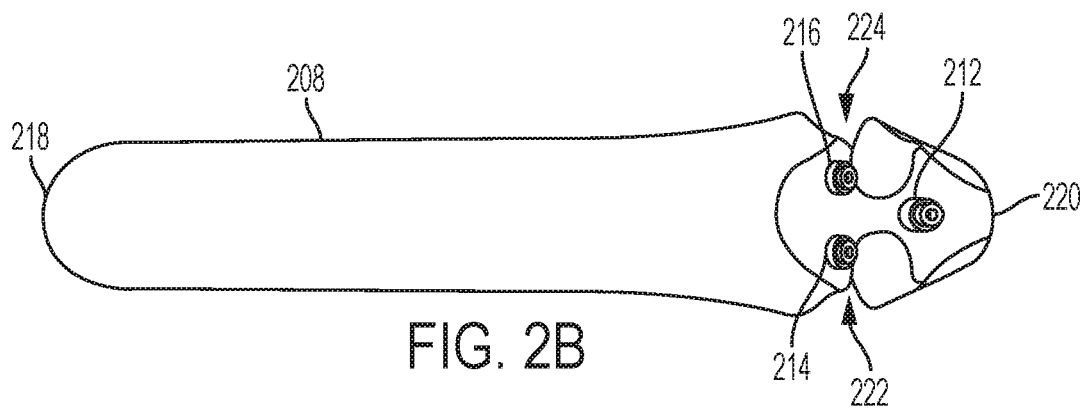
FIG. 2B is a top view of the fender of FIG. 2A.
Figure 2C:
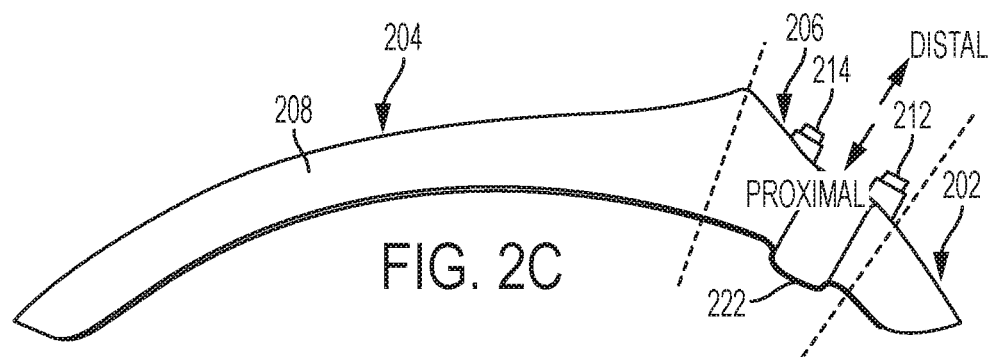
FIG. 2C is a side view of the fender of FIG. 2A, the opposite side view being a mirror image thereof.

With reference now to FIGS. 2A-2F, various views of the exemplary fender 200 are shown. Fender 200 includes an elongated body 201 that is curved from a front edge 203 to a rear edge 205. Also, the body 201 is curved from a first side edge 207 of a pair of side edges to a second side edge 209 of the pair of side edges. Thus, the outer body of the fender provides an overall convex shape which defines within the fender a hollow cavity in a concave shape. The elongated body 201 includes an outer surface 208 and an inner surface 210. Both the outer surface 208 and the inner surface 210 extend from a rear end 218 of the fender 200 to a front end 220 of the fender 200. The rear end 218 of the fender may also be referred to as the rear end of the rear portion 204, and the front end 220 may also be referred to as the front end of the front portion 206. The side edges 207, 209 may be curved such that such that at least a portion of each side edge has a substantially circular arc shape when viewed straight on from a side, as shown in FIG. 2C (see also the side view of FIGS. 1B and 1C showing fender 200 having a circular arc shaped side edge). Rather than a smooth curve as shown, a fender in accordance with the present disclosure can be faceted, or the arc may not have the same center as the wheel.

Additionally, fender 200 includes a front portion 202, a rear portion 204, and a mount portion 206 disposed between the rear portion 204 and the front portion 202. Dashed broken lines that denote the divisions between the rear portion 204, mount portion 206, and front portion 206 are shown in FIG. 2C. The mount portion 206 includes the one or more engagement parts and one or more posts described herein.

Figure 2D:
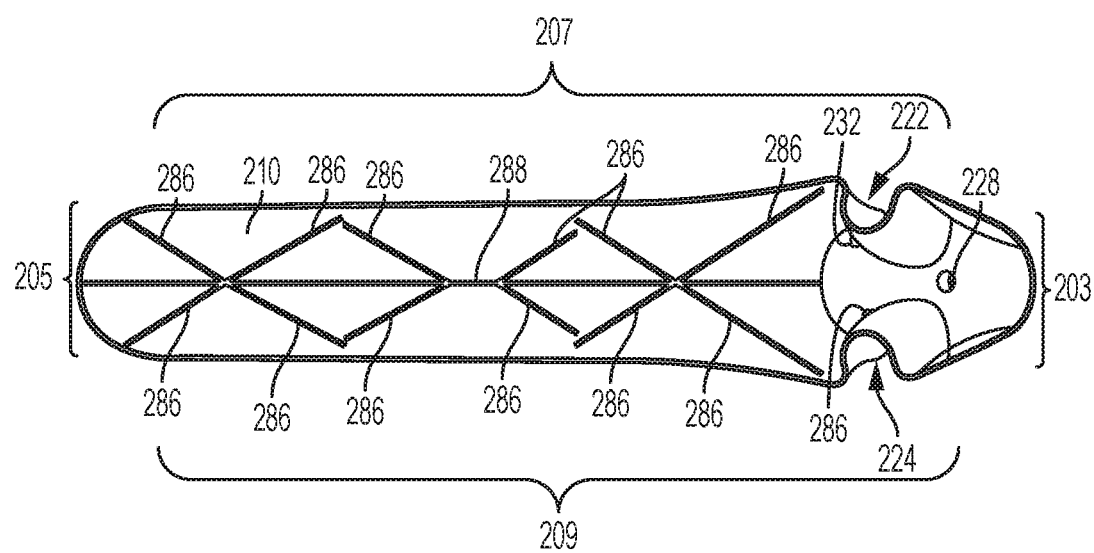
FIG. 2D is a bottom view of the fender of FIG. 2A.

As best shown in FIG. 2D, the fender 200 further includes an uncovered portion exposing a hollow interior cavity. The uncovered portion being at least partially defined by the front edge 203, rear edge 205, and pair of side edges 207 and 209. In an assembled condition, for example as shown in FIGS. 1A-1C, a portion of a wheel may be housed within the hollow interior cavity of a fender in accordance with the present disclosure.

The maximum depth of the hollow interior cavity varies along a length of the elongated body, where the length extends from the elongated body front end 220 to the elongated body rear end 218. Additionally, or alternatively, a width and/or radius of curvature of the cavity may vary along the length of the cavity. In various exemplary embodiments, the maximum depth of the hollow interior cavity along the length of the elongated body 201 from its front end 220 to its rear end 218 is at least about 1.0 inch. More specifically, the maximum depth in some various exemplary embodiments varies from about 1.0 inch to about 18.0 inches along the length extending from the front end to the rear end. In some exemplary embodiments, a large maximum depth may be representative of a large (or long) sidewall of the fender, which allows, for example, space for advertising. The depth of the hollow interior cavity will vary depending on tire size, wheel construction and tolerance. Another factor affecting depth of the hollow interior cavity is whether a suspension system is to be incorporated.

Figure 4A:
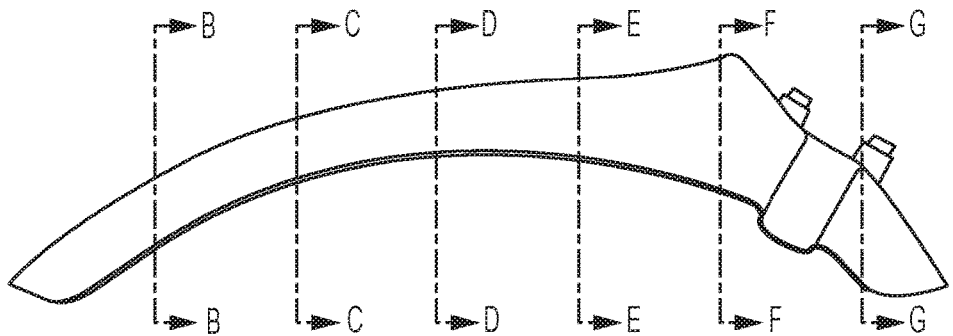
FIG. 4A is an alternative side view of the fender of FIG. 2A.
Figure 4B:
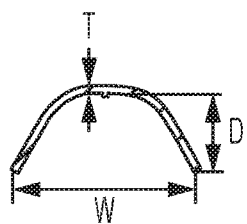
FIG. 4B is a cross-sectional view of the fender of FIG. 4A taken along line B-B in FIG. 4A.
Figure 4C:
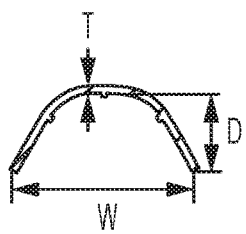
FIG. 4C is a cross-sectional view of the fender of FIG. 4A taken along line C-C in FIG. 4A.
Figure 4D:
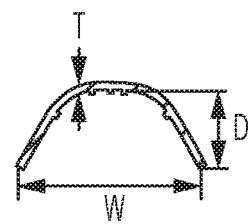
FIG. 4D is a cross-sectional view of the fender of FIG. 4A taken along line D-D in FIG. 4A.
Figure 4E:
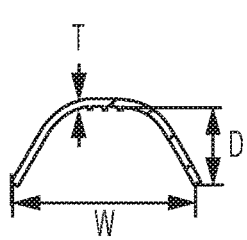
FIG. 4E is a cross-sectional view of the fender of FIG. 4A taken along line E-E in FIG. 4A.
Figure 4F:
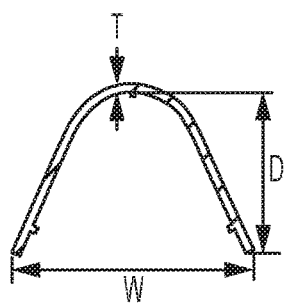
FIG. 4F is a cross-sectional view of the fender of FIG. 4A taken along line F-F in FIG. 4A.
Figure 4G:
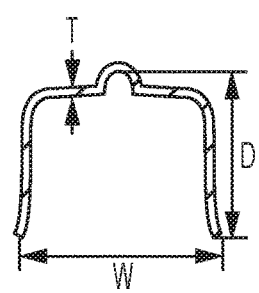
FIG. 4G is a cross-sectional view of the fender of FIG. 4A taken along line G-G in FIG. 4A.

FIGS. 4A-4G show how the depth of the hollow interior cavity varies along a length of the elongated body of exemplary fender 200. FIG. 4A shows a side view of exemplary embodiment of fender 200 with lines B-B through G-G indicating the points at which cross-sectional views shown in FIGS. 4B-4G are taken. The depth of the hollow cavity of the fender 200 differs at each of the lateral cross sections shown in FIGS. 4B-4G. In particular, as shown in FIGS. 4B-4G, an elongated body of fender 200 can have a depth D that varies from about 0.75 inches to about 8.0 inches along a length of the elongated body.

FIGS. 4B-4G also show that elongated body 201 can have a width W that varies from about 3.0 inches to about 4.0 inches along a length of the elongated body. More generally, it is contemplated that various embodiments of a fender, in accordance with the present teachings, may have a width that ranges from about 1.0 inches to about 5.0 inches. In addition, FIGS. 4B-4G illustrate that elongated body 201 can have a lateral thickness T (i.e., a thickness of the wall forming fender body 201 as shown in FIGS. 4B-4G) of about 0.08 to about 0.3 inches.

The variability of the depth of the hollow cavity along the length of the elongated body, from its front end to its rear end, in accordance with the teachings of the present disclosure, may also be characterized in terms of the radial distance from the axle of the wheel of the bike on which the fender is mounted to an imaginary centerline of the elongated body on the inner surface of the fender. For example, with reference to FIG. 1C, the variability of the depth of the hollow cavity along the length of the elongated body 201 of fender 200 from its front end 220 to its rear end 218 may also be illustrated or described as a variable radial distance between the axle 122 of the wheel 110 and the imaginary centerline of the elongated body on the inner surface 210 of the elongated body 201 of the fender 200. Thus, as the depth varies along the length of the cavity of the fender body, the distance of the inner surface of the hollow from the wheel and tire thereof varies as well.

In one exemplary embodiment of the present disclosure, a fender may have a front radial distance defined as an axle-to-front-portion radial distance extending between the axle 122 of the wheel 110 and a portion of the inner surface of the elongated body 201 within the front portion 202 of the fender 200; a rear radial distance defined as an axle-to-rear-portion radial distance extending between the axle 122 of the wheel 110 and a portion of the inner surface 210 of the elongated body 201 within the rear portion 204 of the fender 200; and a mount portion radial distance defined as an axle-to-mount-portion radial distance extending between the axle of the wheel and a portion of the inner surface of the elongated body within the mount portion of the fender. Further, in some exemplary embodiments, the axle-to-mount-portion radial distance is greater than the maximum axle-to-front-portion radial distance and/or the maximum axle-to-rear-portion radial distance.

In some exemplary embodiments of a cycling apparatus with a fender in accordance with the teachings of the present disclosure, a maximum axle-to-fender radial distance extends between the axle of the wheel and a peak point or peak portion of the inner surface of the elongated body, the peak point or peak portion being that which is disposed furthest from the axle, i.e., a greater distance from the axle than any other portion of the of the inner surface of the elongated body. Furthermore, in some exemplary embodiments, the peak point or peak portion is between the elongated body front end and the elongated body rear end, rather than at either of the elongated body front end or the elongated body rear end. For example, as shown in FIG. 1C, a maximum axle-to-fender radial distance 126 extends between the axle 122 of the wheel 110 and a peak point 290 of the inner surface 210 of the elongated body 201 of fender 200, with peak point 290 being between the elongated body front end 220 and the elongated body rear end 218. As will be understood by those of skill in the art, the maximum axle-to-fender radial distance 126 may vary based on the fork design. The peak portion or peak point of the inner surface of the elongated body may be at about the convergence of the rear portion and the mount portion of the fender. For example, peak point 290 of the inner surface 210 of the elongated body 201 of fender 200 is at the convergence of the rear portion 204 and the mount portion 206. The maximum radial depth at the peak point or peak portion of a fender in accordance with the present disclosure may range about 0.25 inches to about 10.0 inches. For example, in one exemplary embodiment, the maximum radial depth $D_{pp}$ at the peak point 290 of fender 200 is about 2.8 inches and the minimum depth is about 0.4 inches.

The variability of the radial depth of the hollow cavity along the length of the elongated body from its front end to its rear end of a fender, in accordance with the present teachings, may also be characterized in terms of the radial clearance between the inner surface of the elongated body of the fender and the radially curved surface of the rim of the wheel. For example, with reference to FIG. 1C, the variability of the radial clearance of the inner surface 210 along the length of the elongated body 201 of fender 200 from its front end 211 to its rear end 213 has a variable radial clearance between the surface 128 of the rim 130 of the wheel 110 and the inner surface 210 of the elongated body 201 of the fender 200.

In some exemplary embodiments of a cycling apparatus with a fender in accordance with the present disclosure, a maximum rim-to-fender radial clearance extends from the rim of the wheel to a peak point or peak portion of the inner surface of the elongated body, the peak point or peak portion being that which is disposed further from the radially curved surface of the rim than any other portion of the inner surface of the elongated body. Furthermore, in some exemplary embodiments, the peak point or peak portion is between the elongated body front end and the elongated body rear end, rather than at either of the elongated body front end or the elongated body rear end. For example, as shown in FIG. 1C, maximum rim-to-fender radial clearance 132 extends from the surface 128 of rim 130 of the wheel 110 to a peak point 290 of the inner surface 210 of the elongated body 201 of fender 200, with peak point 290 being between the elongated body front end 220 and the elongated body rear end 218. More particularly, the peak portion or peak point of the inner surface of the elongated body may be at about the convergence of the rear portion and the mount portion of the fender. For example, peak point 290 of the inner surface 210 of the elongated body 201 of fender 200 is at the convergence of the rear portion 204 and the mount portion 206. The maximum radial clearance at the peak point or peak portion of a fender in accordance with the present disclosure may range about 1.75 inches to about 6.0 inches. For example, the maximum radial clearance $C_{pp}$ at the peak point 290 of fender 200 is about 4.7 inches.

The maximum radial clearance $C_{pp}$ may be determined by the axle-to-fender radial distance 126, minus the outside radius of the rim 130 of the wheel 110. Accordingly, a desired axle-to-fender radial distance 126 may be chosen based on one or more factors including fork design, the diameter of the rim 130, the size (e.g., diameter) of the tire, and any desired clearance between the outer diameter of the tire and the inner surface 210 of the fender 200. Clearance between the inner surface 210 of the fender 200 and the tire may be provided to prevent the tire from rubbing on the fender 200 if the wheel is damaged (e.g., bent or otherwise out of round relative to the axle 122), or to reduce or eliminate interference between the tire and fender 200 caused by a buildup of mud or other debris on the tire and/or inner surface 210 of the fender 200.

Referring again to FIGS. 2A-2F, the mount portion 206 of the fender 200 includes a first engagement part including one or more engaging structures. The first engagement part of fender 200 may include, for example, a structure configured to engage a blade of a fork assembly such as a first recess 222. The first engagement part of fender 200 may also include a second recess 224. The first recess 222 is configured to engage the first blade 116 of the fork assembly 108. The first recess 222 is configured to engage the first blade 116 of the fork assembly 108, for example, as shown in FIGS. 1A-1C. The second recess 224 is configured to engage the second blade 118 of the fork assembly 108, for example, as shown in FIG. 1A. Although other mechanisms for engagement are contemplated, in the exemplary embodiment shown in FIGS. 2A-2F, first recess 222 is configured to engage first blade 116 by partially surrounding the first blade 116, and the second recess 224 is configured to engage second blade 118 by partially surrounding the second blade 118. Fender 200 interlocks with the blades 116 and 118 of the fork assembly when the first recess 222 and second recess 224 are fitted to partially surround the first blade 116 and second blade 118, respectively, so as to at least inhibit, limit, or minimize side-to-side motion of the fender 200 relative to the fork assembly 108 and/or wheel 110. As will be understood, the recesses 224, 224 may vary in shape or size depending on a given cycling apparatus model or style. In general, the recesses may be sized and shaped to receive a blade of a fork assembly therein and to limit/minimize motion of the blade relative to the fender of the fork assembly. Further, each recess may be a depression or contour in the body of the fender, or may alternatively be created by a structure attached to the fender body such as, for example, a metal truss, a reinforced rim of the fender body, or straps in tension. In any of these configurations, the fit between the recess and the blade may be a "snap fit" or may be another type of engagement.

In an alternative embodiment, not shown, a fender may include one or more engaging structures that are each configured to engage the first and/or second spaced apart blades of a fork assembly, respectively, by, completely or substantially surrounding a respective blade 116 or 118. Such structures need not be permanently attached. In another alternative embodiment, not shown, a fender may include a single engaging structure that is configured to simultaneously partially, substantially, or completely surround both the first and second spaced apart blades of a fork assembly. In yet another alternative embodiment, not shown, one or more engaging structures may be configured to engage one or more spaced apart blades in a different manner, such as, for example, via mechanical fasteners (e.g., screw, nuts/bolts, press fittings, plugs, hooks, loops, snap fits, pins, etc.), adhesives, mating surface features (e.g., ridges, steps, etc.), and/or magnets. Such other mechanisms for engagement between engaging structures and one or more spaced apart blades may be used in addition to, or in alternative to, the partial or complete surrounding engagement shown and/or described herein.

In another exemplary embodiment of a fender, and as best shown in FIGS. 2A, 2B, 2C, and 2F, the mount portion 206 of the fender 200 may include a second engagement part configured to engage with the fork assembly. The second engagement part may include, for example, one or more protrusions such as a plurality of posts 212, 214, and 216. Each of the posts 212, 214, and 216 is configured to engage with a portion of the fork assembly to inhibit, limit, and/or minimize fore-and-aft motion of the fender relative to the fork assembly. It also is contemplated that the post and recess connection between the fender and fork assembly may further limit other types of motion between the components. Each of the posts 212, 214, and 216 is configured to engage with a fork crown (e.g., fork crown 120 in FIGS. 1A-1C) of a fork assembly. The plurality of posts of fender 200 are arranged such that there is a front center post 212, a rear right post 214, and a rear left post 216. Alternative arrangements and quantities of posts are also contemplated. For example, it is contemplated that the protrusions may be provided on plate 120 or an alternative structure of the fork assembly while the fender may include recesses configured to receive the protrusions. Both the fender and the crown may each include protrusions and recesses configured to correspondingly engage respective recesses and protrusions in the opposing component. Additionally, protrusions and/or recesses may have a variety of shapes and sizes may be tapered or graduated or have other textured elements. The fit between the two may be, for example, a press fit or a snap fit. In addition, mechanical or other components may be used to strengthen the connection between the protrusion and recess. For example, screws or adhesive may be used.

Advantageously, the front center post 212, rear right post 214, and rear left post 216 are arranged along more than one lateral plane with respect to the fender 200 to provide more effective inhibition, limiting, or minimizing of fore-and-aft movement of an interlocked fender 200 with respect to the fork assembly and wheel of the bicycle. Likewise, the front center post 212, rear right post 214, and rear left post 216 are arranged along more than one longitudinal plane with respect to the fender 200 to provide more effective inhibition, limiting, and/or minimizing of side-to-side movement of an interlocked fender 200 with respect to the fork assembly and wheel of the bicycle. Thus, in accordance with one exemplary embodiment, to provide the advantages associated with multiplanar post arrangement, the arrangement of a plurality of posts includes at least one front post and at least on rear post, and/or at least one right post and at least one left post. Furthermore, in yet another exemplary embodiment, to provide further stability, at least a second front post or at least a second rear post, and/or at least a second right post or at least a second left post is contemplated. Also, although discussed herein with respect to three posts, it is contemplated that fewer or additional posts may be used. Arrangements having fewer posts may include, for example, a single post or two posts. Arrangements having additional posts may include, for example, four posts, five posts, six posts, seven posts, eight posts, nine posts or ten or more posts.

As best shown in FIGS. 2A-2E, each post 212, 214, and 216 of the plurality of posts extends distally from the outer surface 208 of the fender 200. Further, each post 212, 214, and 216 is hollow and each post 212, 214, and 216 includes a distal end opening and a proximal end opening, the proximal end opening being at an opposite end of the post from the distal end opening and is also contiguous with the mount portion 206. Front center post 212 includes a distal end opening 226 and a proximal end opening 228, rear right post 214 includes a distal end opening 230 and a proximal end opening 232, and rear left post 216 includes a distal end opening 234 and a proximal end opening 236. Additionally or alternatively, the posts may be solid or may be filled with another material.

Figure 2E:
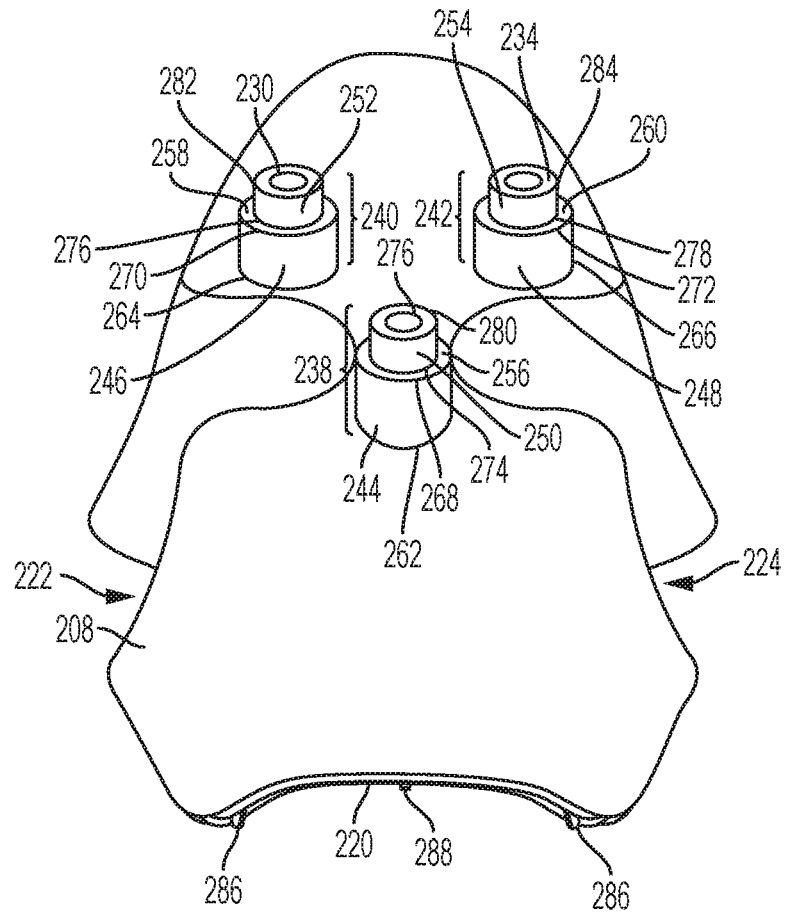
FIG. 2E is a front view of the fender of FIG. 2A.
Figure 2F:
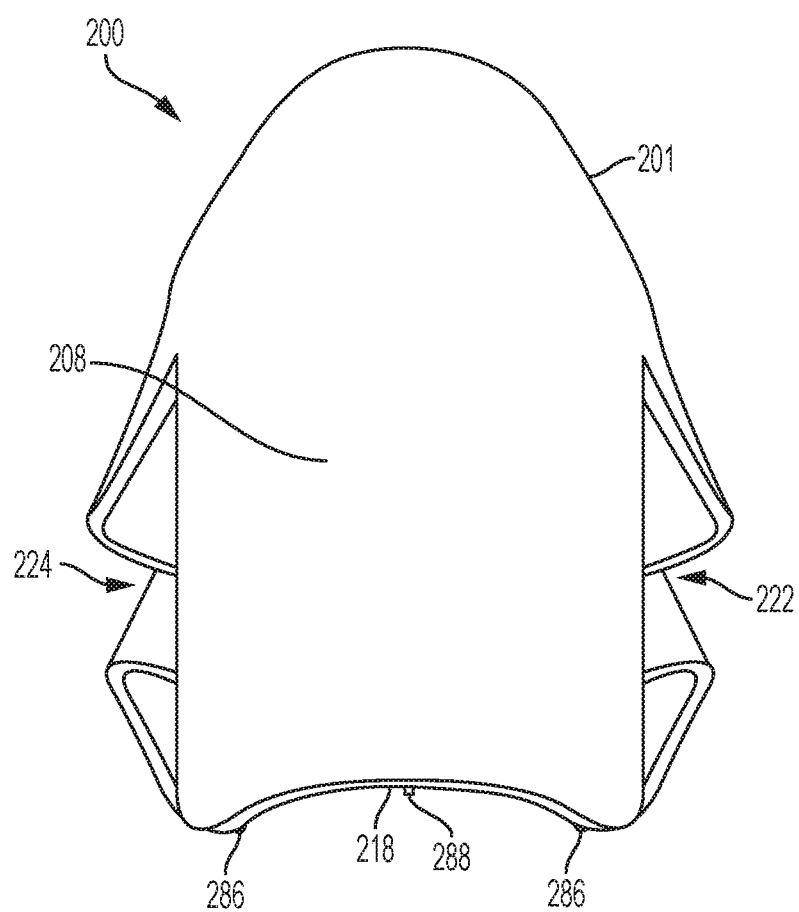
FIG. 2F is a front view of the fender of FIG. 2A.

Further, as best shown in FIG. 2E, each post 212, 214, and 216 includes a respective lateral wall 238, 240, and 242 defining a passage extending from the proximal end opening 228, 232, and 326, respectively, to the distal end opening 226, 230, and 234, respectively, of each respective post 212, 214, and 216. As shown and as contemplated in one exemplary embodiment, the posts may have a stepped or tapered configuration. For example, in FIG. 2E, each lateral wall 238, 240, and 242 has a respective first step forming a tapered portion 244, 246, and 248, a respective step forming a second tapered portion, 250, 252, and 254, and a respective flat portion 256, 258, and 260 between the tapered portions to form a stepped configuration. Each first tapered portion 244, 246, and 248 extends distally from a respective first tapered portion wide end 262, 264, and 266, to a respective first tapered portion narrow end 268, 270, and 272. Each second tapered portion 250, 252, and 254 extends distally from a respective second tapered portion wide end 274, 276, and 278, to a respective second tapered portion narrow end 280, 282, and 284. Each flat portion 256, 258, and 260 extends from the first tapered portion narrow end 268, 270, and 272, respectively, to the second tapered portion wide end 274, 276, and 278, respectively. As best shown in FIGS. 2B and 2E, the outer lateral dimensions of the first tapered portion narrow end 268, 270, and 272 are larger than the outer lateral dimensions of the second tapered portion wide end 274, 276, and 278.

In another exemplary embodiment of a fender in accordance with the present teachings, the fender may include reinforcing elements within the body of the fender. For example, the bottom view of the fender 200 shown in FIG. 2D, shows that fender 200 may include a plurality of reinforcing elements 286, 288. Reinforcing elements 286, 288 may be raised or protrude outwardly from a surface of the fender. For example, as shown in FIG. 2D, the reinforcing elements 286, 288 extend at least partially through/outward from the inner surface 210 of the fender. In such a configuration, the reinforcing elements may be characterized as being "raised," i.e., extending beyond or above the surface of the fender. Although FIG. 2D shows a plurality of reinforcing elements 286, 288 extending from a portion of the inner surface 210 within the rear portion 206 of exemplary fender 200, it is also contemplated that reinforcing elements could extend from a portion of the inner surface 210 of the mount portion 206 and the front portion 202 of the fender 200. Further, although not shown, it is contemplated that reinforcing elements could extend from an upper surface of a fender or may be completely encompassed within the body of the fender such that the reinforcements do not protrude from the body.

As shown in FIG. 2D, the plurality of reinforcing elements may include crosshatched elongated elements 286. Additionally, the plurality of reinforcing elements may include a middle elongated element 288 disposed substantially along a centered midline of the fender 200. Reinforcing elements disposed in various other orientations are also contemplated, such as, for example, laterally oriented elements, additional angulated elongate elements that intersect with or extend from the middle elongated element 288, and additional longitudinally oriented elements. Such elements may be included alternatively, or in addition to, the middle elongated element 288. In accordance with one aspect of the present teachings, various reinforcing elements may extend between about 0.01 and about 0.3 inches from a surface of a fender. It also is contemplated that the reinforcing elements may extend beyond 0.3 inches from a surface of a fender in accordance with the present disclosure.

Both crosshatched elongated elements 286 and the middle elongated element 288 are raised splines with rectangular cross-sectional profiles. Raised splines with alternatively shaped cross-sectional profiles are also contemplated, such as, for example, rounded, or triangular cross-sectional profiles. Raised spline reinforcing elements 286, 288 may be integrally formed with the fender, for example, by being co-molded with the fender during production of the fender. Alternatively, the plurality of reinforcing elements may not be integrally formed with the fender, and may instead be joined to the fender by, for example, adhesion, mechanical fastening, chemical bonding, welding, etc. For example, raised reinforcing elements that are not integrally formed with the fender may include wires, fibers, etc.

Figure 3B:
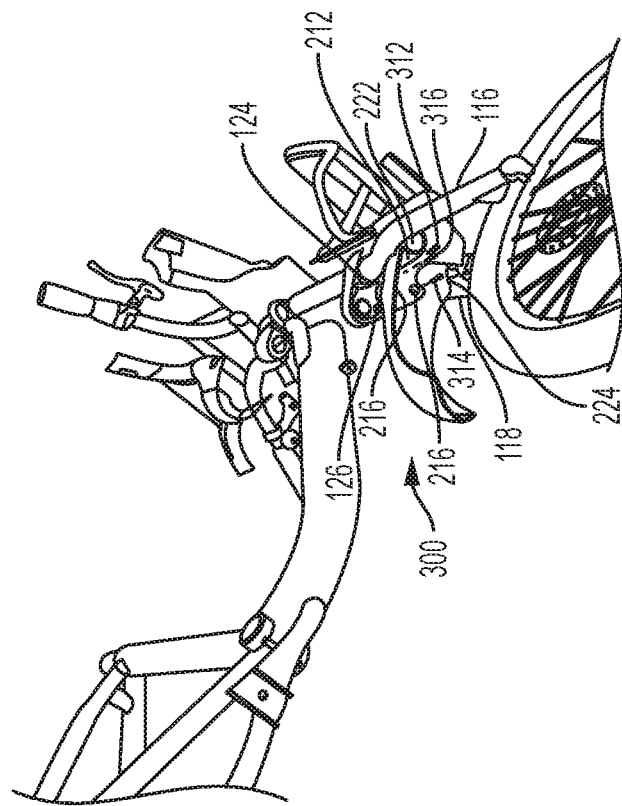
FIG. 3B is an exploded rear-side-angled perspective side view of the exemplary fork assembly and fender assembly of FIG. 3A.
Figure 3A:
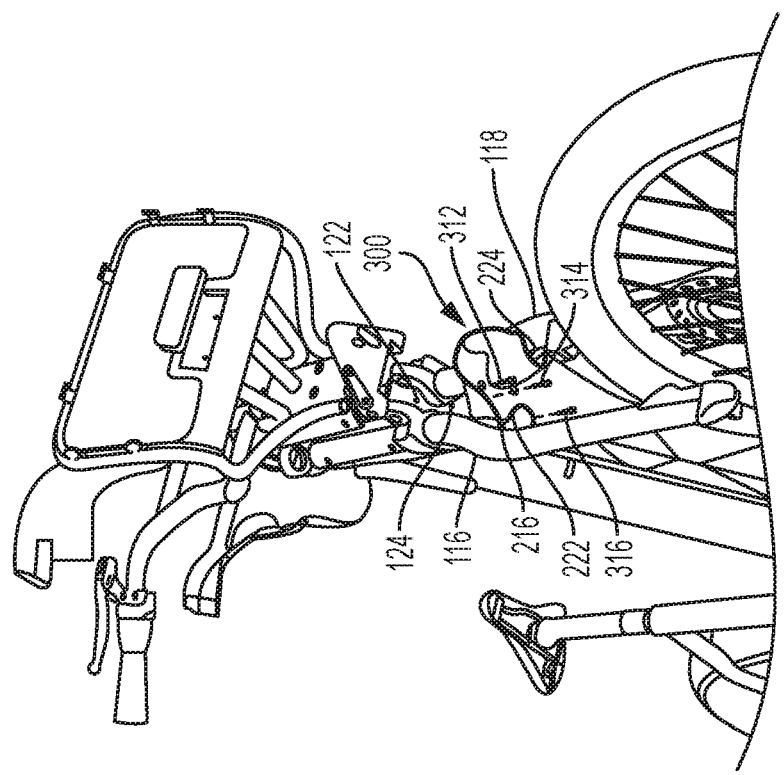
FIG. 3A is an exploded front-side-angled perspective view of an exemplary embodiment of a fork assembly and fender assembly in accordance with the present disclosure.

Turning now to FIGS. 3A and 3B, exploded views of an exemplary embodiment of a fork assembly 108 and an exemplary embodiment of a fender assembly 300 in accordance with the present disclosure are shown. A fender assembly includes a fender and a plurality of fasteners. Moreover, neither a fender assembly nor a fork assembly in accordance with the present disclosure includes one or more braces extending from one or more of the spaced apart blades of the fork assembly. Rather, in various exemplary embodiments, one or more engaging structures of a fender in accordance with the present disclosure engage with one or more of the spaced apart blades, and/or a plurality of protrusions or posts of a fender engage with a portion of the fork assembly, as described herein.

For example, FIGS. 3A and 3B show how first and second engagement parts may engage various parts of the fork assembly. For example, the first engagement part may include recesses 222 and 224. As shown, recesses 222 and 224 are configured to engage with spaced apart blades 116 and 118, respectively. For example, recesses 222 and 224 may be configured to partially surround blades 116 and 118 such that when the fender 200 is mounted on the fork assembly, it interlocked between the blades 116 and 118. Further, as shown in the exemplary embodiment of FIGS. 3A and 3B, the second engagement part may include a plurality of posts 212, 214, and 216 which are configured to engage with a portion of the fork assembly. In particular, posts 212, 214, and 216 (undersides thereof being shown in FIGS. 3A and 3B) are configured to engage with fork crown 120 of at the fork assembly 108. Fork crown 120 may have corresponding fasteners 122, 124, and 126 such as, for example, holes or recesses that receive posts 212, 214, and 216, further securing fender 200 to fork assembly 108. In addition, fasteners 312, 314, and 316 may be inserted at least partially through the openings of posts 212, 214, and 216, and into fork crown 120, to enhance the retention of fender 200 with fork assembly 108. Although fasteners 312, 314, and 316 are shown as bolts in FIGS. 3A and 3B, other types of fasteners may be used, such as, for example, screws, plugs, press-fittings, hooks, ratchet type engagements, glue, adhesive, magnets, etc. Likewise, although corresponding fasteners 122, 124, and 126 are shown as holes in FIGS. 3A and 3B, other types of fasteners may be used such as recesses, depressions, threads, loops, adhesive, glue, magnets, etc.

Fender assemblies of the present disclosure, such as, for example fender assembly 300, can be repaired and replaced more efficiently in part because the fender assembly does not include one or more braces extending from one or more of the spaced apart blades of the fork assembly. Moreover, fender assemblies of the present disclosure, such as, for example fender assembly 300, are less susceptible to damage in part because the fender assembly does not include one or more braces extending from one or more of the spaced apart blades of the fork assembly.

It is to be understood that the examples and embodiments set forth herein are non-limiting, and modifications to structure, dimensions, materials, and methodologies may be made without departing from the scope of the present disclosure.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

What is claimed is:

1. A fender for a cycling apparatus, the fender comprising:
a front portion;
a rear portion;
a first engagement part configured to engage with at least one blade of a pair of spaced apart blades of a fork assembly;
a second engagement part between the rear portion and the front portion, the second engagement part configured to engage with a portion of the fork assembly other than the pair of spaced apart blades of the fork assembly, the second engagement part including a plurality of posts each configured to be received by a respective recess of a plurality of recesses in the portion of the fork assembly.

2. The fender of claim 1, wherein the fender does not engage the fork assembly via one or more braces extending from either of the pair of spaced apart blades of the fork assembly.

3. The fender of claim 1, wherein, in a mounted position, a radial clearance between an inner surface of the fender and a radially curved surface of a wheel rotatably mounted to wheel receiving portions of the pair of spaced apart blades varies along a length extending from the front portion to the rear portion of the fender.

4. The fender of claim 1, wherein:
the fender comprises an elongated body having a generally concave inner surface, the inner surface defining a hollow cavity of the body,
wherein the hollow cavity comprises:
a length extending from the front portion of the fender to the rear portion of the fender;
a width extending between side edges of the body;
a depth extending between an inner surface of the body and an imaginary line extending centrally between the side edges of the body and generally parallel with the side edges of the body, wherein the depth of the cavity varies along the length of the cavity.

5. The fender of claim 4, wherein the hollow cavity curves along its length.

6. The fender of claim 4, wherein the depth of the cavity varies from about 1.2 inches to about 3.0 inches along the length of the cavity.

7. The fender of claim 4, wherein a maximum depth of the hollow cavity is greater than about 1.0 inch.

8. The fender of claim 4, wherein the hollow cavity is a single cavity that extends from a front end of the body to a rear end of the body.

9. The fender of claim 4, further comprising a plurality of reinforcing elements molded into the body.

10. The fender of claim 9, wherein the plurality of reinforcing elements have a cross-hatched pattern extending diagonally across the body.

11. The fender of claim 1, wherein the first engagement part and the second engagement part each form a portion of a mount portion between the rear portion and the front portion of the fender.

12. The fender of claim 1, wherein the first engagement part comprises a recess configured to receive the at least one blade of the pair of spaced apart blades.

13. The fender of claim 1, wherein the first engagement part comprises first and second recesses, each recess configured to receive a respective blade of the pair of spaced apart blades of the fork assembly.

14. The fender of claim 1, wherein the first engagement part includes a structure configured to at least partially surround the at least one blade of the pair of spaced apart blades of the fork assembly.

15. A cycling apparatus, comprising:
a fork assembly including a pair of spaced apart blades, each blade comprising a respective wheel receiving portion;
a wheel with an axle including a pair of axle end portions, each axle end portion being rotatably received in the respective wheel receiving portion; and
a fender comprising an elongated body having a generally concave inner surface, the inner surface defining a single hollow cavity of the body, wherein the hollow cavity comprises:

a length extending from a front of the body to a rear of the body, and a width extending between side edges of the body, wherein the fender further comprises a mount portion between the front and rear of the body, and wherein a radial distance between an approximate longitudinal centerline of an inner surface of the body and a radial surface of the wheel varies along a length of the elongated body and is less at the front of the body and the rear of the body than at the mount portion; and wherein the elongated body comprises a single-piece structure.

16. The cycling apparatus of claim 15, wherein a distance between the approximate longitudinal centerline of the inner surface of the body and the radial surface of the wheel is less at a front portion and a rear portion of the fender than at a middle portion of the fender.

17. The cycling apparatus of claim 15, wherein a maximum radial distance between the approximate longitudinal centerline of the inner surface of the body and the axle of the wheel is less at a front portion and a rear portion of the fender than at a middle portion of the fender.

18. The cycling apparatus of claim 15, wherein the fender further comprises:

a front portion; and a rear portion;

wherein the mount portion comprises an engagement part configured to minimize side-to-side motion of the fender relative to the fork assembly.

19. The cycling apparatus of claim 15, wherein the fender further comprises:

a front portion; and a rear portion;

wherein the mount portion comprises an engagement part configured to minimize fore-and-aft motion of the fender relative to the fork assembly.

20. The cycling apparatus of claim 15, wherein the fender further comprises:

a front portion; and a rear portion;

wherein the mount portion comprises a first engagement part configured to minimize side-to-side motion of the fender relative to the fork assembly and a second engagement part configured to minimize fore-and-aft motion of the fender relative to the fork assembly.

21. A cycling apparatus, comprising:

a fork assembly including a pair of spaced apart blades, each blade comprising a respective wheel receiving portion;

a wheel with an axle including a pair of axle end portions, each axle end portion being rotatably received in the respective wheel receiving portion; and a fender comprising an elongated body having a generally concave inner surface, the inner surface comprising a continuous molded surface defining a hollow cavity of the body, wherein the hollow cavity comprises:

a length extending from a front of the body to a rear of the body, and a width extending between side edges of the body, wherein a radial distance between an approximate longitudinal centerline of the inner surface of the body and the axle of the wheel comprises:

an axle-to-front-portion radial distance extending from the axle of the wheel to a portion of the inner surface of the elongated body within a front portion of the fender;

an axle-to-rear-portion radial distance extending from the axle of the wheel to a portion of the inner surface of the elongated body within a rear portion of the fender; and an axle-to-mount-portion radial distance extending from the axle of the wheel to a portion of the inner surface of the elongated body within a mount portion of the fender;

wherein the axle-to-mount-portion radial distance is greater than the axle-to-front-portion radial distance or the axle-to-rear-portion radial distance.

22. A cycling apparatus, comprising:

a bicycle fork assembly including a pair of spaced apart blades, each blade comprising a respective wheel receiving portion;

a wheel with a rim and an axle including a pair of axle end portions, each axle end portion being rotatably received in the respective wheel receiving portion; and a fender comprising a front portion, a rear portion, and a mount portion disposed between the rear portion and the front portion, the mount portion comprising a first engagement part comprising at least one recess engaging one of the blades of the pair of blades of the fork assembly, the first engagement part being configured to minimize side-to-side motion of the fender relative to the fork assembly and a second engagement part configured to minimize fore-and-aft motion of the fender relative to the fork assembly.

23. The cycling apparatus of claim 22, wherein the first engagement part further comprises a second recess engaging the other of the blades of the pair of blades of the fork assembly.

24. The cycling apparatus of claim 23, wherein the second engagement part includes at least one protrusion received in a recess of a plate portion of the fork assembly.

25. The cycling apparatus of claim 24, wherein the at least one protrusion includes a plurality of posts received in respective recesses of the plate portion of the fork assembly.

26. The cycling apparatus of claim 25, wherein the posts are fastened in the respective recesses by at least one of press-fit or friction-fit elements, snap-fit elements, mechanical fastening elements, and adhesive elements.

27. The cycling apparatus of claim 22, wherein the cycling apparatus is at least partially pedal-powered.

28. The cycling apparatus of claim 22, wherein the at least one recess is configured to at least partially surround the at least one blade of the pair of spaced apart blades.

* * * * *